Sept. 6, 1949.　　　　　A. A. JOSWICK　　　　　2,481,224
REEL TRUCK

Filed Feb. 28, 1946　　　　　　　　　　　　　　　2 Sheets—Sheet 1

Inventor
Alexander A. Joswick

By Clarence A. O'Brien
and Harvey B. Jackson
Attorneys

Sept. 6, 1949.   A. A. JOSWICK   2,481,224
REEL TRUCK
Filed Feb. 28, 1946   2 Sheets—Sheet 2
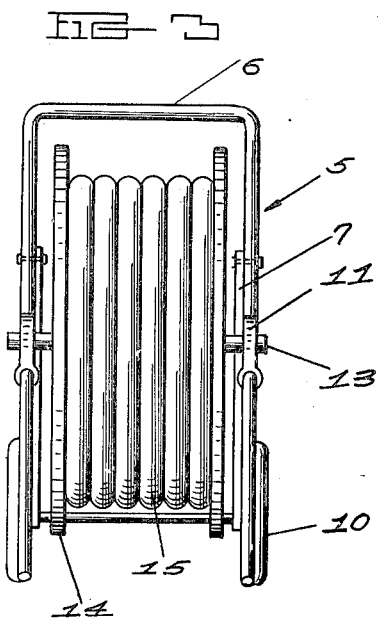
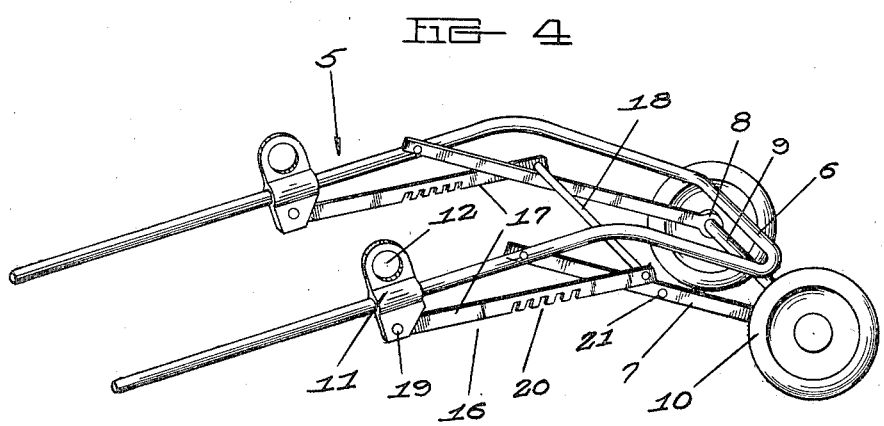
Inventor
ALEXANDER A. JOSWICK
By Clarence A. O'Brien
and Harvey B. Jackson
Attorneys Patented Sept. 6, 1949

2,481,224

UNITED STATES PATENT OFFICE 2,481,224

REEL TRUCK

Alexander A. Joswick, Bayonne, N. J.

Application February 28, 1946, Serial No. 650,840

2 Claims. (Cl. 242—87)

1

The present invention relates to new and useful improvements in trucks and more particularly to a device of this character adopted for handling heavy reels on which cable, wire, rope and the like are wound and unwound, the truck embodying means whereby the reel may be easily and quickly mounted in position thereon with comparatively slight physical effort.

An important object of the present invention is to provide a truck of this character on which the reel may be supported in an elevated position while winding or unwinding the cable thereon and in which the truck is adjustable to accommodate reels of various sizes.

Another object of the invention is to provide a truck of this character on which the reel may be transported from place to place, when desired.

A still further object of the invention is to provide a reel supporting truck of simple and practical construction, which is strong and durable, efficient and reliable in use and otherwise well adapted for purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a front elevational view, and

Figure 4 is a perspective view showing the truck in its lowered position for mounting the reel in position thereon.

Figure 1:
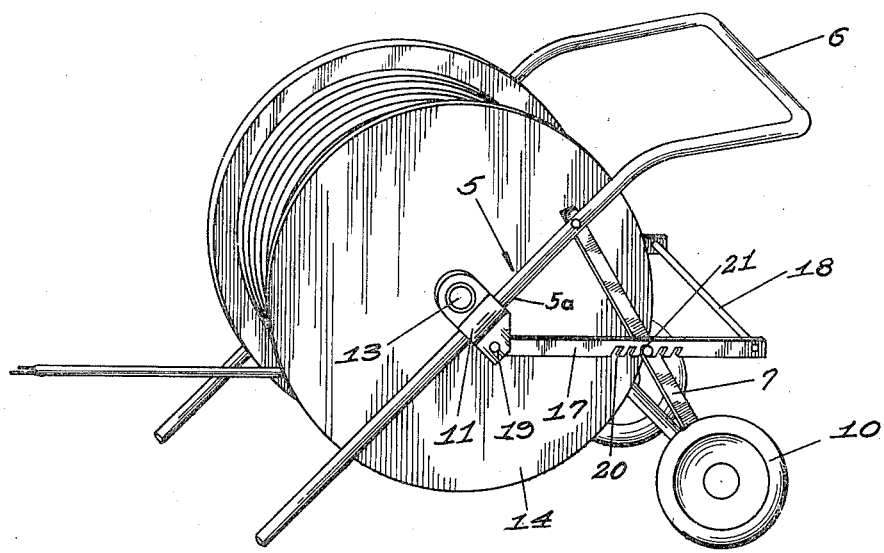
Figure 1 is a perspective view showing the reel supported on the truck in elevated position.

Referring now to the drawings in detail wherein for the purpose of illustration I have disclosed a preferred embodiment of the invention, the numeral 5 designates a U-shaped handle which has its closed end or bight portion 6 curved downwardly.

A pair of bars 7 are pivotally mounted at one end to the sides 5a of the handle 5 intermediate the ends thereof, the other ends of the bars 7 being formed with eyes 8 for pivotally connecting the same to an axle 9 on which a pair of ground wheels 10 are journalled.

The open end of the handle 5 is designated as its front end and secured to each side of the handle forwardly of the front ends of the bars 7 are a pair of bearings 11 having openings 12 therein adapted to receive the shaft or trunnions 13 of a reel 14 on which rope or cable 15 is wound.

2

An adjustable U-shaped locking bar 16 includes a pair of longitudinally extending bars 17 connected to each other at one end by a transverse bar 18, the front ends of the bars 17 being pivoted to a lower edge of the bearings 11 by pins or the like 19. The cross bar 18 at the rear end of the locking bar 16 is adapted to rest on the upper edges of the pair of bars 7 when the truck is moved into its lowermost position as shown in Figure 4 of the drawings. The lower edges of the longitudinal bars 17 are formed with longitudinally spaced notches 20 adapted for receiving pins, or protuberances, 21 projecting outwardly at the sides of the bars 7 intermediate the ends of the latter.

Upon releasing the locking bar 16 from the pins 21 of the bars 7 the handle 5 may be lowered so as to position the opening 12 of the bearings 11 for receiving the shaft or trunnion 13 of the reel 14. The rear end 6 of the handle 5 is then raised into the position as shown in Figure 1 of the drawings whereby the reel 14 is elevated above the ground and supported in its elevated position by the engagement of the pins 21 in the notches 20 of the locking bar 16, the handle 5 and bars 17 thus being secured in an upwardly inclined position and with the front ends of the handle 5 resting on the ground.

Figure 2:
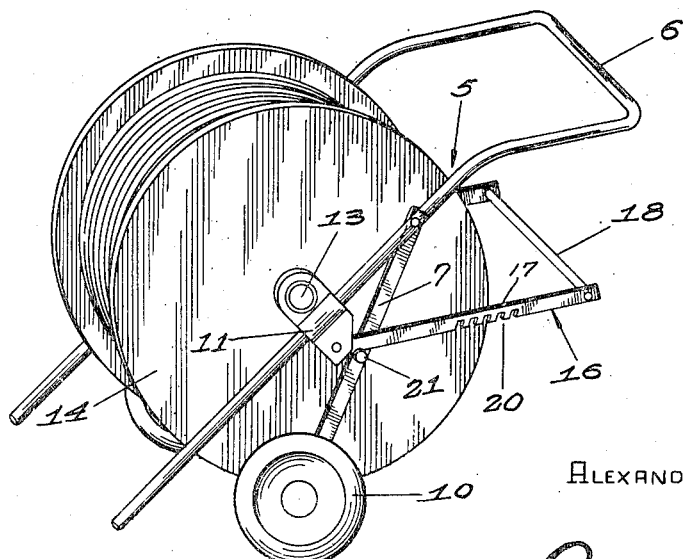
Figure 2 is a similar view showing the truck arranged for transporting the reel.

When it is desired to move the truck from place to place for transporting the reel the rear end of the handle 5 is raised upwardly from the position shown in Figure 1 to that shown in Figure 2 and the bars 7 swung forwardly to move the wheels 10 forwardly of the bearings 11 and shaft 13 of the reel and the longitudinal bars 17 of the locking bar 16 then rests on the pins 21 at a point adjacent the front end of the locking bar. The rear end of the handle 5 is then tilted downwardly sufficiently to remove the front ends of the handle out of contact with the ground and the truck may then be pushed or pulled along the ground to move the reel into a desired position for either reeling or unreeling the cable or rope therefrom.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A reel truck comprising an axle having a pair of wheels journaled thereon, a pair of bars projecting in parallelism from the axle, a U-shaped handle including a pair of spaced parallel side members and a closed rear end, said bars being pivoted at one end to an intermediate portion of said side members of the handle, bearings carried by said side members forwardly of the pivots of said pair of bars and adapted for rotatably supporting a reel thereon, and a locking bar securing the pair of bars against pivotal movement on the handle, said locking bar being pivoted to said side members forwardly of the pivots of said pair of bars and including a transverse bar engaging said pair of bars to support one end of the handle in an elevated position while its other end is resting on the ground.

2. A reel truck comprising an axle having a pair of wheels journaled thereon, a pair of bars projecting in parallelism from the axle, a U-shaped handle including a pair of spaced parallel side members and having a closed rear end, said bars being pivoted at one end to an intermediate portion of said side members of the handle, bearings carried by said side members forwardly of the pivots of said pair of bars and adapted for rotatably supporting a reel thereon, a U-shaped locking bar pivoted to said side members forwardly of the pivots of said pair of bars, and a protuberance projecting from at least one of said pair of bars intermediate its ends and adapted for engagement by the locking bar to support the reel in an elevated position on the wheels of the truck.

ALEXANDER A. JOSWICK.

REFERENCES CITED

The following references are of record in the file of this patent:

UNITED STATES PATENTS

| Number | Name | Date |
| --- | --- | --- |
| 205,738 | Douglas | July 9, 1878 |
| 394,556 | Coleman | Dec. 18, 1888 |
| 699,221 | McKee | May 6, 1902 |